US008880112B2

(12) United States Patent
Huschke et al.

(10) Patent No.: US 8,880,112 B2
(45) Date of Patent: Nov. 4, 2014

(54) METHODS AND ARRANGEMENTS IN A WIRELESS COMMUNICATION SYSTEM

(75) Inventors: Joerg Huschke, Aachen (DE); Muhammad Kazmi, Bromma (SE); Farshid Ghasemzadeh, Sollentuna (SE)

(73) Assignee: Optis Cellular Technology, LLC, Plano, TX (US)

( * ) Notice: Subject to any disclaimer, the term of this patent is extended or adjusted under 35 U.S.C. 154(b) by 661 days.

(21) Appl. No.: 13/148,433

(22) PCT Filed: Jun. 23, 2009

(86) PCT No.: PCT/SE2009/050790
§ 371 (c)(1),
(2), (4) Date: Aug. 8, 2011

(87) PCT Pub. No.: WO2010/090567
PCT Pub. Date: Aug. 12, 2010

(65) Prior Publication Data
US 2012/0289278 A1    Nov. 15, 2012

Related U.S. Application Data

(60) Provisional application No. 61/150,856, filed on Feb. 9, 2009.

(51) Int. Cl.
*H04B 7/00* (2006.01)
*H04W 52/38* (2009.01)
(Continued)

(52) U.S. Cl.
CPC .......... *H04W 51/146* (2013.01); *H04W 52/38* (2013.01); *H04W 52/16* (2013.01);
(Continued)

(58) Field of Classification Search
USPC ............. 455/522, 69, 436, 423, 452.2, 67.11, 455/456.1, 501, 509, 67.13, 515, 115.1; 370/328, 335, 329
See application file for complete search history.

(56) References Cited

U.S. PATENT DOCUMENTS 5,579,373 A * 11/1996 Jang ............................. 455/522
5,845,212 A * 12/1998 Tanaka ......................... 455/522
(Continued)

FOREIGN PATENT DOCUMENTS

CN        1922791 A       2/2007
EP        1 835 627 A1    3/2006
(Continued)

OTHER PUBLICATIONS

Office Action, Japanese Application No. 2011-549115, Jun. 27, 2013, 8 pages.
(Continued)

*Primary Examiner* — John J Lee
(74) *Attorney, Agent, or Firm* — Vincent J. Allen; James H. Ortega; Carstens & Cahoon, LLP

(57) ABSTRACT

Methods are provided in a first radio network node for supporting transmission power adjustment of a mobile terminal and in a second radio network node for assisting the first radio network node in supporting such adjustment. The first radio network node and the mobile terminal are adapted to operate on a first radio access technology. The power adjustment of the mobile terminal is performed in order to reduce interference, caused by the mobile terminal, on the second radio network node. The second radio network node is adapted to operate on a second radio access technology. The method includes obtaining an indication that the second radio network node is interfered by transmissions from the mobile terminal, obtaining values of power control parameters for adjusting the transmission power of the mobile terminal and transmitting the obtained power control parameter values to the mobile terminal, in order to enable the adjustment of the transmission power of the mobile terminal. Related arrangements are also provided herein.

22 Claims, 5 Drawing Sheets

(51) Int. Cl.
*H04W 52/24* (2009.01)
*H04B 17/00* (2006.01)
*H04W 52/16* (2009.01)
*H04W 52/22* (2009.01)
*H04W 52/36* (2009.01)
*H04W 92/20* (2009.01)

(52) U.S. Cl.
CPC .......... H04W 52/226 (2013.01); *H04W 52/243* (2013.01); *H04W 52/367* (2013.01); *H04W 52/225* (2013.01); *H04B 17/005* (2013.01); *H04W 92/20* (2013.01)
USPC ........... 455/522; 455/69; 455/501; 455/456.1

(56) References Cited

U.S. PATENT DOCUMENTS

| | | | |
|---|---|---|---|
| 7,539,489 B1 * | 5/2009 | Alexander | 455/423 |
| 2003/0198200 A1 * | 10/2003 | Diener et al. | 370/329 |
| 2005/0075077 A1 * | 4/2005 | Mach et al. | 455/67.13 |

FOREIGN PATENT DOCUMENTS

| | | |
|---|---|---|
| GB | 2 304 495 A | 3/1997 |
| JP | 2008-283491 | 11/2008 |
| WO | WO 2007/122297 A1 | 11/2007 |
| WO | WO 2009/068727 A1 | 6/2009 |
| WO | WO 2009/141686 A1 | 11/2009 |

OTHER PUBLICATIONS

Notification of Transmittal of the International Search Report and the Written Opinion of the International Searching Authority, or the Declaration, PCT/SE2009/050790, Mar. 10, 2010.
Notification of Transmittal of International Preliminary Report on Patentability, PCT/SE2009/050790, May 4, 2011.
Written Opinion of the International Searching Authority.
Written Opinion of the International Preliminary Examining Authority.
3$^{rd}$ Generation Partnership Project; Technical Specification Group GSM/EDGE Radio Access Network; Radio Transmission and Reception (Release 1999) 3GPP TS 05.05 V8.20.0 (Nov. 2005).
3$^{rd}$ Generation Partnership Project; Technical Specification Group Radio Access Network; User Equipment (UE) Radio Transmission and Reception (FDD) (Release 8) 3GPP TS 25.101 V8.5.1 (Jan. 2009).
3$^{rd}$ Generation Partnership Project; Technical Specification Group Radio Access Network; Base Station (BS) Radio Transmission and Reception (FDD) (Release 8) 3GPP TS 25.104 V8.5.0 (Dec. 2008).
3$^{rd}$ Generation Partnership Project; Technical Specification Group Radio Access Network; Evolved Universal Terrestrial Radio Access (E-UTRA); User Equipment (UE) Radio Transmission and Reception (Release 8) 3GPP TS 36.101 V8.4.0 (Dec. 2008).
3$^{rd}$ Generation Partnership Project; Technical Specification Group Radio Access Network; Evolved Universal Terrestrial Radio Access (E-UTRA); Base Station (BS) Radio Transmission and Reception (Release 8) 3GPP TS 36.104 V8.4.0 (Dec. 2008).
3$^{rd}$ Generation Partnership Project; Technical Specification Group Radio Access Network; Evolved Universal Terrestrial Radio Access (E-UTRA); Physical Layer Procedures (Release 8) 3GPP TS 36.213 V8.5.0 (Dec. 2008).
3$^{rd}$ Generation Partnership Project; Technical Specification Group Radio Access Network; Evolved Universal Terrestrial Radio Access (E-UTRA); Radio Frequency (RF) System Scenarios; (Release 8) 3GPP TR 36.942 V8.1.0 (Dec. 2008).
First Office Action, Chinese Patent Application No. 200980156771.7, Jul. 1, 2013.
Search Report, Chinese Patent Application No. 200980156771.7, Jun. 22, 2013.

* cited by examiner

METHODS AND ARRANGEMENTS IN A WIRELESS COMMUNICATION SYSTEM

CROSS-REFERENCE TO RELATED APPLICATIONS

This application is a 35 U.S.C. §371 national stage application of PCT International Application No. PCT/SE2009/050790, filed on Jun. 23, 2009, which claims priority to U.S. Provisional Application No. 61/150,856, field Feb. 9, 2009, the disclosures and content of which are incorporated by reference herein as if set forth in their entirety. The above-referenced PCT International Application was published in the English language as International Publication No. WO 2010/090567 on Aug. 12, 2010.

The present invention relates to a method and arrangement in a first radio network node and a method and arrangement in a second radio network node. More in particular, the present invention relates to a mechanism for reducing channel interference between co-located radio network nodes by supporting transmission power adjustment of a mobile terminal.

BACKGROUND

Multiple Radio Access Technologies (RAT) are being commonly deployed in the same geographical areas by the same or different operators. There are also already several frequency bands standardized for multiple technologies. For instance according to various Third Generation Partnership Project (3GPP) standards different types of technologies such as Global System for Mobile Telecommunications (GSM), UMTS Terrestrial Radio Access Network (UTRAN), Evolved UTRAN (E-UTRAN) etc. may operate in the same frequency band. There are even bands in which both 3GPP and non-3GPP technologies such as Code Division Multiple Access 2000 (CDMA2000) or High Rate Packet Data (HRPD) can be deployed. Secondly the multifarious technologies may also co-exist in adjacent carrier frequencies in the same band. The radio transmission and reception requirements, which are specified in the standard, are generally different for different types of technologies. E-UTRA supports multiple bandwidths ranging from 1.4 MHz to 20 MHz. Thus the out of band emission requirements of E-UTRAN are adapted to support larger bandwidths. E-UTRAN may sometimes also be referred to as Long Term Evolution (LTE).

According to the E-UTRAN standard, a resource block size is 180 KHz comprising 12 sub-carriers each with 15 KHz carrier spacing and 0.5 ms time slot in frequency and time domains, respectively. The Transmission Time Interval (TTI) comprises 2 time slots, which correspond to 1 ms length in time. The radio frame is 10 ms long.

The E-UTRA uplink uses Single-Carrier Frequency Division Multiple Access (SC-FDMA) whereas the downlink uses Orthogonal Frequency Division Multiple Access (OFDMA). The SC-FDMA can be regarded as a special form of OFDMA. More specifically it is a linearly pre-coded OFDMA scheme resulting in lower Peak to Average Power Ratio (PAPR). The lower PAPR implies relatively smaller User Equipment (UE) power back-off, or maximum power reduction, to meet the emission requirements. Due to these reasons the SC-FDMA is considered more suitable for uplink transmission. Both OFDMA and SC-FDMA or any variant of OFDMA ensures inter-user orthogonality.

Thus by the virtue of SC-FDMA in the E-UTRA uplink which allows the possibility of frequency domain scheduling, the users' transmissions within the same cell are orthogonal. This means an E-UTRA terminal can transmit with relatively higher power without interfering with other E-UTRA terminals in the uplink. Due to higher terminal transmission power, the radio emissions emanating from E-UTRAN have more severe impact on the performance of the co-existing victim GSM or UTRAN radio networks rather than the other way around.

Although a wireless device typically operates in a well defined portion of the frequency band, emissions outside its operating bandwidth and also outside its operating band are unavoidable. Therefore, terminals as well as base stations have to fulfil a specified set of Out Of Band (OOB) emission requirements. The objective of OOB emission requirements is to limit the interference caused by the transmitters, terminals or base stations, outside their respective operating bandwidths to the adjacent carriers or bands. In fact, all wireless communication standards such as e.g. GSM, UTRAN, E-UTRAN, Wireless Local Area Network (WLAN) etc, clearly specify the OOB emission requirements to limit or at least minimize the unwanted emissions. They are primarily approved and set by the national and international regulatory bodies e.g. ITU-R, FCC, ARIB, ETSI etc.

The major OOB emission requirements, which are typically specified by the standards bodies and eventually enforced by the regulators in different countries and regions for both terminals and base stations comprises: Adjacent Channel Leakage Ratio (ACLR), Spectrum Emission Mask (SEM), Spurious emissions and/or In-band unwanted emissions.

The specific definition and the specified level of these requirements can vary from one system to another. Typically these requirements ensure that the emission levels outside an operating bandwidth or band in some cases remain several tens of dB below compared to the wanted signal in the operating bandwidth. Although OOB emission level tends to decay further away from an operating band, they are not completely eliminated in at least the adjacent carrier frequencies. Just to mention some arbitrary examples, In E-UTRAN the terminal ACLR is 30 dB for an adjacent E-UTRA carrier. However, E-UTRA terminal ACLR for an adjacent UTRA carrier is 3 dB tighter i.e. 33 dB. In UTRA FDD (WCDMA) the terminal ACLR is 33 dB The frequency bands, channel arrangements and radio requirements applicable for the GSM operation are standardized. Also the frequency bands for UTRAN FDD (WCDMA) operation are standardized. The same set of specifications provides a complete set of UTRAN FDD minimum radio requirements including those related to the Out Of Band emissions for mobile terminal and the base station. These requirements are used by the manufacturers to build products such as e.g. mobile terminal and base station.

Similarly the frequency bands and channel arrangements applicable for E-UTRAN operation are standardized. The same set of specifications also provide a complete set of E-UTRAN (FDD and TDD) minimum radio requirements including those related to the out of band emissions for mobile terminals and base stations. These requirements are used by the manufacturers to build E-UTRA products such as e.g. mobile terminal and base station.

One observation about the bands standardized for GSM, UTRA and E-UTRA is that a large number of these bands are applicable for all the three technologies, i.e. GSM, UTRA and E-UTRA, whereas few of them are exclusively for one or two of these access technologies. Nonetheless, a large number of bands are specified to be applicable for all the technologies. For instance GSM band I (450 MHz) is not used for UTRAN or E-UTRAN.

Even if a band is common for multiple technologies, the channel arrangement and radio requirements for each individual technology are specified in its respective set of specifications.

For instance the following three frequency bands are commonly applicable for GSM, UTRAN FDD and E-UTRAN FDD: GSM bands: extended 800 (band V), 1800 (band VII) and 1900 (band VIII); UTRAN FDD bands: VIII, III and II and E-UTRAN FDD bands: 8, 3 and 2.

Similarly frequency bands 2 GHz and 2.6 GHz are specified for both UTRAN FDD and E-UTRAN FDD: UTRAN FDD bands: band I: 2 GHz and band VII: 2.6 GHz; E-UTRAN FDD bands: band 1: 2 GHz and band 7: 2.6 GHz.

Evidently from the above examples it is inferred that the operation of multiple technologies within the same band in the same region would be inevitable. Indeed common frequency bands such as 800 MHz, 1800 MHz, 2 GHz and 2.6 GHz are considered to be interesting candidates for the operation of more than one technology.

Furthermore, when more than one technology is used in the same band then their operation in the adjacent carriers would also be a frequent case. Since the most severe impact of the Out Of Band emission is in the adjacent or the closest carriers, therefore ACLR requirements may be stringent enough to ensure sufficient protection. As previously discussed above, and depending on terminal output power distribution, the out of band emissions and particularly the adjacent channel interference are unavoidable. This in turn leads to performance degradation and overall capacity loss.

It may be noted that the UTRAN FDD operation adjacent to an operating E-UTRA carrier is particularly vulnerable to the emissions caused by the E-UTRA carrier. This is because the E-UTRA terminal power distribution is higher compared to that of the UTRA terminal. This in turns leads to higher out of band emissions from E-UTRA towards UTRA FDD causing higher degradation in UTRA performance. The higher terminal power distribution causes degradation on adjacent systems and can either be handled by more stringent out of band emission requirements, which are not feasible from the terminal implementation point of view. Alternatively this can be addressed more conveniently by controlling the terminal transmission power by means of a suitable power control scheme.

In E-UTRAN the uplink power control has both open loop component and closed loop components. The former is derived by the mobile terminal in every sub-frame based on the network signalled parameters and estimated path loss or path gain. The latter part is governed primarily by the Transmit Power Control (TPC) commands sent in each sub-frame, i.e. active sub-frame where transmission takes place, to the mobile terminal by the network. This means the mobile terminal transmits its power based on both open loop estimation and TPC commands.

Furthermore, using the principles of power control open and closed loop components as described above, the mobile terminal sets the uplink transmit power for PUCCH or PUSCH or Sounding Reference Signals (SRS) channels depending upon which of these channels (PUCCH, PUSCH and SRS) are transmitted in a sub-frame.

The uplink transmitted power for RACH transmission is only based on the open loop components such as i.e. path loss and network signalled parameters.

The network can also estimate both open loop components, including path loss, and closed loop components of the uplink transmitted power since parameters and TPC commands are transmitted by itself. The network is also aware of the total number of active users in a cell. In this way the network may infer the total amount of interference experienced in the uplink due to uplink transmission. This allows the network to set various set of signalled parameters and monitor the consequence of power control on the uplink interference.

Thus the uplink power control in E-UTRAN is governed by a number of network controlled parameters. Therefore, in E-UTRAN, the uplink power control is highly parameterized. The mobile terminal derives its transmitted power for uplink transmission in each sub-frame using the configured parameters in conjunction with the received TPC command and the estimated path loss. This result in that the mobile terminal uplink transmitted power in E-UTRAN is highly sensitive to the parameters set by the network. Furthermore, there is also a possibility to configure a mobile terminal to accumulate certain number of consecutive power control commands. This may cause large change in the transmitted power of the mobile terminal in one direction in case it receives several consecutive up or down commands. Furthermore, due to the packet oriented nature of E-UTRAN, the change in power in one sub-frame can be very large e.g. 10-20 dB. In summary all these factors contribute to relatively higher terminal output power in E-UTRAN. Unnecessarily high terminal output power would not only increase uplink received interference within an operating carrier frequency but also adversely impact the reception quality at the adjacent carriers. The uplink in E-UTRA is orthogonal i.e. inter-E-UTRA user orthogonality in the same cell, which mean that high terminal transmit power may not have negative impact on other E-UTRA users.

Furthermore, as multiple technologies may co-exist in the same band, a multi-RAT adjacent channel scenario as described herein may occur occasionally.

Hence, highly parameterized E-UTRA uplink power control makes non E-UTRA carrier operation in adjacent carriers highly vulnerable to interference. Thus inappropriately chosen uplink power control parameters would lead to significant loss in the UTRAN capacity when operating in an adjacent carrier. Currently, there is no restriction on the ranges of parameter employed for the E-UTRA terminal uplink power control.

It may be mentioned as an illustrative example that the UTRAN FDD capacity loss when E-UTRAN/LTE is an aggressor may be in the order of 25%, according to some estimations.

SUMMARY

It is an object of the present invention to provide a mechanism for improving the performance within a wireless communication network.

In order to maintain the performance of a first access technology, such as e.g. E-UTRAN and minimize the performance degradation of the victim system in a co-existence scenario, the present solution aims at improving, e.g. optimizing and/or limiting the values of parameters used for running the uplink power control, at the interfering aggressor system.

Therefore according to the present methods, the values of the power control parameters are limited so as to ensure that the performance of the victim system is minimally impacted. Secondly the bounded power control parameter values may also minimally impact the interfering or the so-called aggressor system.

According to a first aspect, the object is achieved by a method in a first radio network node for supporting transmission power adjustment of a mobile terminal. The first radio network node and the mobile terminal are adapted to operate on a first radio access technology. The adjustment of transmission power of the mobile terminal is performed in order to reduce interference, caused by the mobile terminal, on a second radio network node. The second radio network node is adapted to operate on a second radio access technology. The method comprises obtaining an indication that the second radio network node is interfered by transmissions from the mobile terminal. Also, the method comprises obtaining values of power control parameters for adjusting the transmission power of the mobile terminal. In addition, the method comprises transmitting the obtained power control parameter values to the mobile terminal, in order to enable the adjustment of the transmission power of the mobile terminal.

According to a second aspect, the object is also achieved by an arrangement in a first radio network node for supporting transmission power adjustment of a mobile terminal. The first radio network node and the mobile terminal are adapted to operate on a first radio access technology. The adjustment of transmission power of the mobile terminal is performed in order to reduce interference, caused by the mobile terminal, on a second radio network node. The second radio network node is adapted to operate on a second radio access technology. The arrangement comprises a first obtaining unit. The first obtaining unit is adapted to obtain an indication that the second radio network node is interfered by transmissions from the mobile terminal. Further, the arrangement comprises a second obtaining unit. The second obtaining unit is adapted to obtain values of power control parameters for adjusting the transmission power of the mobile terminal. In yet further addition, the arrangement comprises a transmitter. The transmitter is adapted to transmit the obtained power control parameter values to the mobile terminal in order to enable the adjustment of the transmission power of the terminal.

According to a third aspect, the object is also achieved by a method in a second radio network node for assisting a first radio network node in supporting transmission power adjustment of a mobile terminal in order to reduce interference, caused by the mobile terminal. The first radio network node and the second radio network node are situated at the same geographical location. The first radio network node and the mobile terminal are configured for operation on a first radio access technology. The second radio network node is configured for operation on a second radio access technology. The method comprises measuring the signal interference induced by the mobile terminal. Further the method comprises sending an indication that the second radio network node is interfered by transmissions from the mobile terminal, if the measured signal interference from the mobile terminal exceeds a certain predetermined threshold limit value.

According to a fourth aspect, the object is also achieved by an arrangement in a second radio network node for assisting a first radio network node in supporting transmission power adjustment of a mobile terminal in order to reduce interference, caused by the mobile terminal. The first radio network node and the second radio network node are situated at the same geographical location. The first radio network node and the mobile terminal are configured for operation on a first radio access technology. The second radio network node is configured for operation on a second radio access technology. The arrangement comprises a measuring unit. The measuring unit is adapted to measure the signal interference induced by the mobile terminal. Also, the arrangement comprises a transmitter. The transmitter is adapted to transmit an indication that the second radio network node is interfered by transmissions from the mobile terminal, if the measured signal interference from the mobile terminal exceeds a certain predetermined threshold limit value.

Thanks to the present methods and arrangements it is possible to reduce performance degradation in a victim system while at the same time reduce limitation of performance in an interfering aggressor system in a co-existence scenario. Thus an improved performance within a wireless communication network is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The present solution is defined as a method and an arrangement in a first and a second radio network node, which may be put into practice in the embodiments described below. The present solution may, however, be embodied in many different forms and may not be construed as limited to the embodiments set forth herein; rather, these embodiments are provided so that this disclosure will be thorough and complete, and will fully convey the scope of the present solution. It should be understood that there is no intent to limit the present methods, and arrangements to any of the particular forms disclosed, but on the contrary, the present methods and arrangements are to cover all modifications, equivalents, and alternatives falling within the scope of the present solution as defined by the claims.

The present solution may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

Figure 1:
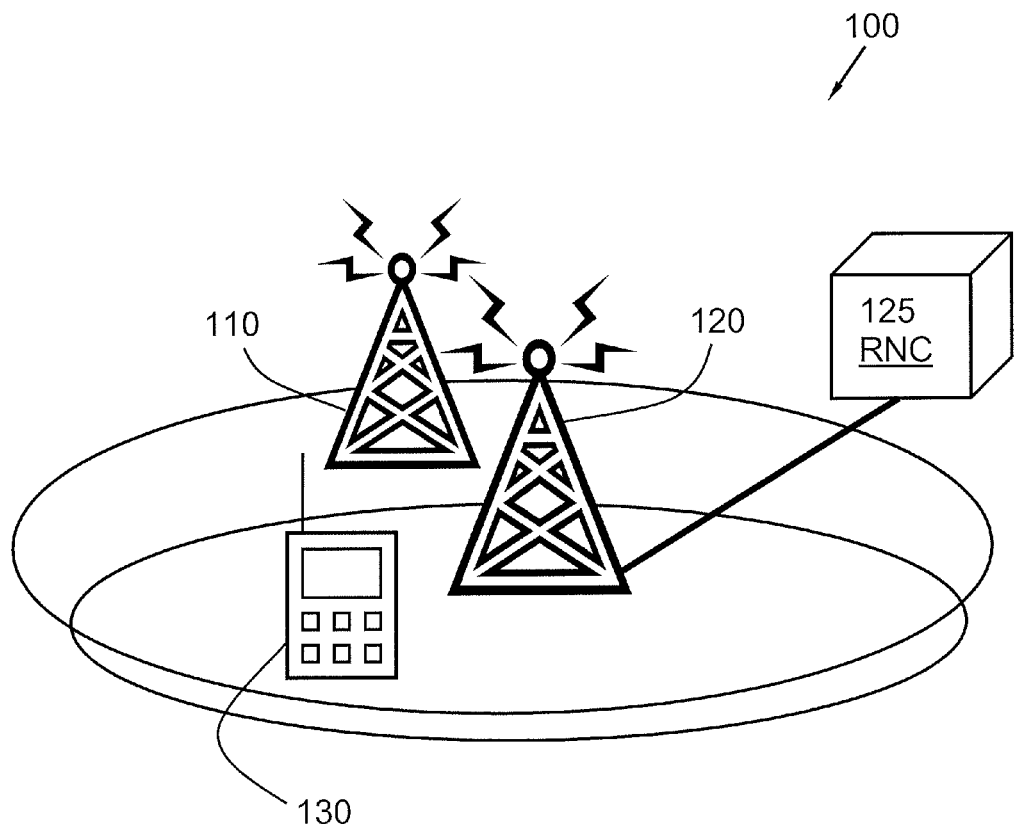
FIG. 1 is a block diagram illustrating a wireless communication system.

FIG. 1 is a schematic illustration over a geographical location 100. The geographical location 100 may be referred to as a site. The geographical location 100 comprises a first radio network node 110, operating on a first radio access technology. The geographical location 100 may further comprise a second radio network node 120, operating on a second radio access technology. The second radio network node 120 may optionally be attached to a control node 125, depending on the radio access technology used. Further, the geographical location 100 is arranged to comprise at least one mobile terminal 130.

It is to be noted that the embodiment illustrated in FIG. 1 is only a non-limiting example of a possible environment, or geographical location 100 wherein the present method may be implemented.

A plurality of radio network nodes 110, 120 may be co-located at the same site, e.g. with antenna means mounted on the same physical structural element such as e.g. radio tower, according to some embodiments.

According to some embodiments, the first radio network node 110 within the geographical location 100 may be arranged to operate on a plurality of radio access technologies, thus sharing certain structural elements e.g. power amplifier. Thus it may be considered that the second radio network node 120 may be comprised within the first radio network node 110, according to some embodiments, but operating on different radio access technologies.

However, according to some embodiments, the first radio network node 110 and the second radio network node 120 may be operated by different service providers, and thus not sharing structural elements.

Thus, although two radio network nodes 110, 120 are illustrates in FIG. 1, it is to be understood that another configuration of radio network nodes 110, 120 may be comprised within the geographical location 100, such as e.g. one, two, three, four, or another plurality of radio network nodes 110, 120, arranged to operate on one, two, three, four, or another plurality of radio access technologies.

Each of the radio network nodes 110, 120 may also be referred to as e.g. a base station, an access point, a Node B, an eNode B, a base transceiver station, Access Point Base Station, base station router, etc depending e.g. of the radio access technology used. However, in order to not unnecessarily complicate the understanding of the present methods and arrangements, the expression "radio network node" will be used consistently in this text for describing the radio network nodes 110, 120.

The mobile terminal 130, may be a user equipment (UE) such as e.g. a wireless communication terminal, a mobile cellular telephone, a Personal Digital Assistant (PDA), a laptop, a computer or any other kind of device capable of managing radio resources, adapted to communicate wirelessly with any of the radio network nodes 110, 120 within range.

The radio access technologies used for wireless communication may comprise technologies such as e.g. E-UTRAN, UTRAN, GSM, Enhanced Data rates for GSM Evolution (EDGE), General Packet Radio Service (GPRS), Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR), HRPD Universal Mobile Telecommunications System (UMTS) etc, just to mention some few arbitrary and none limiting examples.

Further, as used herein, radio access technologies used within the radio network nodes 110, 120 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

The optional control node 125 may be e.g. a Radio Network Controller (RNC). The control node 125 is a governing element, responsible for control of the radio network node 120, which are connected to the control node 125. The control node 125 may further for example carry out radio resource management; some of the mobility management functions, just to mention some brief examples illustrating some possible functionalities of the control node 125.

The mobile terminal 130 may further communicate with other terminals not shown in FIG. 1, via any radio network node 110, 120 comprised within the geographical location 100.

The expression "downlink" is here used to specify the transmission from the radio network node 110, 120 to the mobile terminal 130, while the expression "uplink" is used to denote the transmission from the mobile terminal 130 to the radio network node 110, 120.

In the subsequent exemplary description of the present invention, the first radio network node 110 is communicating with the mobile terminal 130 using a first radio access technology, which communication cause degradation to the second radio network node 120, adapted to operate on a second radio access technology. Thus the first radio network node 110 is part of an interfering system, or aggressor system while the second radio network node 120 is part of a victim system.

The present method defines a power control parameter value region, e.g. upper bound the power control parameter values such that degradation to the victim system in a co-existence scenario may be below an accepted limit as well as the performance loss in the own-system, interfering system, or aggressor system, may be reduced. The region may be determined using simulations or measurement devices.

The defined power control parameters values i.e. their maximum limit, may be used by the actual devices to keep the degradation below the limit at the victim system in a co-existence scenario. The radio network node 110, 120 may take into consideration the maximum i.e. the constrained values of the defined parameters values, when configuring or signalling power control parameters to the mobile terminal 130. The mobile terminal 130 may use the signalled values to derive its uplink transmission power.

According to some embodiments, the power control parameters may be set according to the following method. The uplink output power $P^i_{UL}$ for transmission in sub-frame "i" is derived by the mobile terminal 130 according to the following state of the art general expression:

$$P_{UL}{}^i = \min\{P_{UE}{}^{max}, F(PL_i, TPC_i, \rho_1, \rho_2, \ldots, \rho_N)\} \quad (1)$$

Where: PL is path loss between the mobile terminal 130 and the radio network node 110, 120. TPC is the power control command received by the mobile terminal 130 from the radio network node 110 it may take one of the pre-defined values. Parameters: $\rho_{1\ldots N}$ may be signalled to the mobile terminal 130 by the network. $P^{max}_{UE}$ is the mobile terminal 130 maximum output power generally after applying maximum power reduction or after the so-called power back-off. It may be observed from (1) that the set of parameters ($\rho_{1\ldots N}$) if configured judiciously may be used to control the interference to the victim system. This is further elaborated below. $PL_i$ is the path loss from the network node 110 to the mobile terminal 130.

$I^J_{max}$ may be the maximum acceptable interference to the victim system, "J". Then the maximum allowed $I^J_{max}$ may be achieved by limiting the power control parameters as follows:

$$\rho_k \leq \gamma_k^J; \ 1 \leq k \leq N \quad (2)$$

Where: $\gamma^J$ is the maximum value of the $k^{th}$ parameter ($\rho_k$) in order to ensure the interference from mobile terminals 130 at the victim system "J" is below the maximum allowed level ($I^J_{max}$).

Hence the set of maximum allowed power control parameter values ($\gamma_{1\ldots N}$) may depend upon the victim system. This is the basic idea of the invention and is expressed by (2). One aspect is thus to find suitable values, which depend upon the victim system.

Depending upon the victim system, different parameters may have different maximum allowed values. Hence, there may be one or more set of parameter values to be defined. This may be referred to as the set of "maximum allowed parameter values". Such a set of maximum values or a table may be pre-defined e.g. in a standard. Alternatively, according to some embodiments, it may be implemented as an algorithm at the radio network node 110, 120. In case of standardized table or set, the radio network node 110, 120 with certain advantage may use the power control parameters under the constraints expressed by the pre-defined standardized table or the set.

The set of "maximum allowed parameter values" to limit degradation in co-existence scenario may be standardized, according to some embodiments. The reason is that the interfering system and the victim system may belong to two different operators, as previously discussed. The standardized rules or set of parameter values may ensure that the performance of the victim system may not degrade below the limit, regardless of the co-existence scenarios e.g. E-UTRAN and UTRAN in adjacent carriers.

The methods of determining each set, which is applicable to a particular scenario comprising of an aggressor and a victim radio network, e.g. E-UTRAN and UTRAN FDD, is described in the following descriptive text.

For the E-UTRAN uplink the setting of the terminal Transmit power $P_{PUSCH}$ for the physical uplink shared channel (PUSCH) transmission in subframe i is defined by:

$$P_{PUSCH}(i)=\min\{P_{MAX}, 10\log_{10}(M_{PUSCH}(i)+P_{O\_PUSCH}(j)+\alpha(j)\cdot PL+\Delta_{TF}(i)+f(i)\} \quad (3)$$

Where: $P_{MAX}$ is the maximum allowed power, configured by higher layers. $M_{PUSCH}(i)$ is the bandwidth of the PUSCH resource assignment expressed in number of resource blocks valid for subframe i. $P_{O\_PUSCH}(j)$ is a parameter composed of the sum of a cell specific nominal component $P_{O\_NOMINAL\_PUSCH}(j)$ provided from higher layers for j=0 and 1 and a terminal specific component $P_{O\_UE\_PUSCH}(j)$ provided by higher layers for j=0 and 1. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH}(2)=0$ and $P_{O\_NOMINAL\_PUSCH}(2)=P_{O\_PRE}+\Delta_{PREAMBLE\_Msg3}$, where the parameter PREAMBLE_INITIAL_RECEIVED_TARGET_POWER, $P_{O\_PRE}$ and $\Delta_{PREAMBLE\_Msg3}$ may be signalled from higher layers. For j=0 or 1, $\alpha\in\{0, 0.4, 0.5, 0.6, 0.7, 0.8, 0.9, 1\}$ is a 3-bit cell specific parameter provided by higher layers. For j=2, $\alpha(j)=1$. PL is the downlink pathloss estimate calculated in the mobile terminal 130 in dB and PL=referenceSignalPower–higher layer filtered RSRP, where referenceSignalPower may be provided by higher layers. $\Delta_{TF}(i)=10\log_{10}(2^{MPR\cdot K_S}-1)$ for $K_S$=1.25 and 0 for $K_S$=0 where $K_S$ is given by the terminal specific parameter delta-MCS-Enabled provided e.g. by higher layers. MPR=TBS/$N_{RE}$ where TBS is the Transport Block Size and $N_{RE}$ the number of resource elements determined as $N_{RE}=M_{PUSCH}\cdot N_{sc}^{RB}\cdot N_{symb}^{PUSCH}$, where $N_{symb}^{PUSCH}$ is defined and TBS and $M_{PUSCH}$ may be obtained from the initial PDCCH for the same transport block. f(i) is a value resulting from the closed loop contribution of the power control. In principle, the admissible parameter region could depend on all of the parameters used in (3) except for the Path Loss (PL).

However, the definition of the border of the region may be made as simple as possible. Therefore, according to some embodiments, the admissible region may only depend on the following two variables:

$\alpha$ and $P_0$=10$\log_{10}(M_{PUSCH}(i))+P_{O\_PUSCH}(j)+\Delta_{TF}(i)+f(i)-N$ Where: N is the thermal noise power in one resource block. Thereby, the power control equation may be simplified to:

$$P_{PUSCH}(i)=\min\{P_{MAX}, P_0(j)+\alpha(j)\cdot PL+N\}dbm$$

The admissible region for $\alpha$ and $P_0$ may be found e.g. by radio network simulations. In the preceding sections, the uplink power control on PUSCH channel is used as an example to determine the parameters, whose admissible values are to be determined and defined to limit the adjacent channel interference. However similar explanation may be applicable to other E-UTRA channels such as Physical Uplink Control CHannel (PUCCH), Sounding Reference Signal (SRS) and Physical Random Access CHannel (PRACH) etc. But certain channels are more sensitive such as PUSCH since it may typically carry higher data rate.

Table 1 illustrates some arbitrary and non-limiting examples of parameters concerning the possible admissible and/or allowed values of the parameter ($\alpha$ and $P_0$) in an urban environment, according to some embodiments.

| | |
|---|---|
| inter site distance (ISD) | 750 m |
| pathloss model | L/dB = $L_0$ + $\gamma \cdot \log_{10}$(R/km) |
| | $L_0$ = 128.1 |
| | $\gamma$ = 37.6 |
| Minimum coupling loss (MCL) | 70 dB |

For $\alpha\geq 0.4$ the mean cell throughput resulting from the maximum admissible $P_0$ for each $\alpha$ may be approximated very well by the following equation:

$$P_0=111-100.4\cdot\alpha$$

Expressed as an inequality that defines the admissible parameter region:

$$P_0\leq 111-100.4\cdot\alpha$$

For $\alpha$=0 the curve deviates a bit more from the straight line, therefore the constraint may be specified separately:

$$P_0(\alpha=0)\leq 107.5$$

The region does not change with the inter-site distance (ISD) as long as the fraction of mobile terminals 130 experiencing a coupling loss to the serving base station 110, 120 that is equal to the minimum coupling loss does not change, or is sufficiently small.

For other path loss exponents $\gamma$ the admissible parameter region is different. Table 2 shows an illustrative example of some possible propagation parameters which may be defined for the rural environment, according to some embodiments. The corresponding results for the admissible region for $\alpha$ and $P_0$, and the throughput for "$\alpha$" are different.

| | |
|---|---|
| inter site distance (ISD) | 3000 m |
| frequency band | 900 MHz |
| pathloss model | L/dB = $L_0$ + $\gamma \cdot \log_{10}$(R/km) |
| | $L_0$ = 95.5 |
| | $\gamma$ = 34.1 |
| MCL | 80 dB |

For $\alpha\geq 0.4$ the admissible region may be approximated by the following inequality:

$$P_0\leq 109-88.2\cdot\alpha$$

For $\alpha$=0 the curve deviates a bit more from the straight line, therefore the constraint is specified separately:

$$P_0(\alpha=0)\leq 106.8$$

This region may comprise i.e. the urban propagation environment which may be more constraining than the rural one. This if the intention is to define only a single region that ensures the constraint on interference to UTRAN regardless of the propagation environment e.g. urban environment needs to be used.

The present method concept, according to some embodiments may be that the maximum allowed interference at the victim system in a co-existence scenario, such as e.g. E-UTRA, UTRAN and GSM, could be achieved by limiting the values of one or more power control parameters at the interfering system.

The restricted use of the power control parameter values may apply to the radio network node 110, 120 configuring or signalling the parameters to the mobile terminal 130 as may be the case in E-UTRAN. However in a system where the mobile terminal 130 derives similar parameters for the uplink power control, such restriction or maximum allowed values may be taken into account by the mobile terminal 130 when deriving the parameters to be used for uplink power control. In either case, the constrained power control parameters' values may preferably pre-defined in the standard. Alternatively in the latter scenario they may be signalled to the mobile terminal 130.

Furthermore, the present method is applicable in a system with good inter-user orthogonality within the same cell. This is due to the fact that in such system the mobile terminal transmission power, e.g. power distribution or average values may be higher and thus causing interference to the victim system. Thus the present method may be particularly applicable to system based on OFDMA type technology e.g. OFDMA itself or SC-FDMA or the like. More specifically the power control admissible region in E-UTRAN may be enforced by two set of network signalled parameters: $P_0$: Parameter constituting the target or expected receiver power at the radio network node 110, 120, where $P_0$ itself comprises of one or more network controlled parameters; and Cell specific parameter ($\alpha$).

In the basic embodiment the constraint on these power control parameters' values may be defined regardless of the propagation environment used. To account for all possible environments, the constraint may be based on the most stringent environment e.g. comprising of highly dispersive radio channel. Another possibility may be to use the most typical or commonly used radio environment.

According to some embodiments, constraint on the power control parameters' values may be defined to be specific to each radio environment or group of similar radio environments, such as e.g. group comprising of less dispersive and more dispersive channels and/or lower terminal speed and higher terminal speed and/or higher or lower impact of the distance between the mobile terminal 130 and the network nodes 110, 120 on the path loss.

Since the network is aware of the radio environment, it may use the most relevant set of constrained parameters in a given environment. These rules may be pre-defined in the standard i.e. maximum allowed parameters values for different radio environments. For instance multiple set of constrained parameters can be tied to the relevant radio environment and this relationship can be pre-defined. As an example set of parameters with low, i.e. maximum allowed values are most relaxed, medium and high level of constraint are specified to be followed in least dispersive, e.g. rural area, in somewhat dispersive e.g. sub-urban area and in most dispersive, e.g. typical urban or dense urban areas radio environments respectively.

In some embodiments the constraint on the power control parameter values may be applied to all mobile terminals 130 regardless of whether they are using the Physical Resource Blocks (PRBs) at the edge of the channel bandwidth or not.

According to some embodiments the constraint may be applicable only for mobile terminals 130 using the physical resource blocks at the edge of the channel bandwidth.

In some embodiments, different set of constrained power control parameter values may be applied for mobile terminals 130 using physical resource blocks at the channel bandwidth edge and for mobile terminals 130 not using any physical resource blocks at the channel bandwidth edge.

According to yet some embodiments, the constraint on the power control parameter values may be applied only to specific channel or specific set of channels e.g. PUSCH, PUCCH/PUSCH or SRS/PUSCH.

In some additional embodiments, the constraint may be applied regardless of the type of channel used for uplink transmission i.e. constrained power control parameter values are applicable for any type of transmission.

In yet some embodiments, channel specific constraint values such as i.e. different for different channels or group of channels, may be applied.

According to some embodiments, the constraint on the power control parameters may be applied to mobile terminals 130 in the cell border region. The mobile terminal 130 in cell border region may be determined based on radio propagation conditions such as e.g. path loss, signal strength, signal quality etc. The reason is that such mobile terminals 130 may be expected to transmit at higher output power level. In such case, a threshold e.g. in terms of path loss, may be pre-defined in the standard and/or implemented as an algorithm in the network. If terminal path loss is larger than the threshold, then the network may apply the constraint power control parameters.

Alternatively according to some embodiments, path loss or signal quality specific constrained values, i.e. different set for mobile terminals 130 in cell border and those close to the radio network node 110, 120.

According to some embodiments, the constrained on the power control parameters may be applied to the mobile terminal 130 which may transmit a data block larger than a certain threshold. This is because larger data block requires more transmission power contributing more interference at the adjacent channel.

Alternatively the constraint may be applicable regardless of the data block size used for uplink transmission.

In yet some embodiments, different set of constrained power control parameter values may be applied for different set of data block sizes e.g. values corresponding to small, medium and large block sizes.

Further, according to some embodiments, the constraint on the power control parameters may be applied depending upon the service in use.

The mobile terminal 130 may typically operate at lower transmission power when using low bit rate service e.g. voice. On the other hand, large file upload may be characterized by large data block, which requires higher transmission power. Thus in one embodiment the constrained on power control parameter values may be applied to service using large data block.

Alternatively according to some embodiments, service specific constrained values, i.e. different sets for different type of services may be applied.

The mobile terminal 130 may operate in Discontinuous Transmission Mode (DTX) and/or Discontinuous Reception Mode (DRX). This may be particularly more common for certain types of service e.g. Voice over IP (VoIP). However, the currently described embodiments may apply independent of the type of service.

In some embodiments, the constraint on the power control parameters' values may be applied depending upon the terminal transmission activity. A mobile terminal 130 with lower transmission activity may less severely interfere with the victim system in an adjacent channel.

Thus in some embodiments, the constraint may be applied to the mobile terminal 130 whose data transmission activity is above a certain threshold value.

According to some embodiments, different constrained power control parameters' values for different level of transmission activity may be levelled, applied e.g. different values for lower activity, medium activity and higher activity.

According to some further embodiments, it may be specified or pre-defined that the constrained power control parameters' values are to be applied by the first radio network node 110 only when any of the pre-defined co-existence scenarios, e.g. LTE, UTRAN and GSM, may be used. For instance the constrained values are to be applied if there is UTRAN FDD operation in the operating band of the interfering system in a particular coverage area. In this embodiment there may be one set of constrained values regardless of the pre-defined co-existence scenario.

Further, according to yet some embodiments, the power control parameter values' may be specific for a co-existence scenario e.g. different for LTE-UTRAN, LTE-GSM etc.

However if all systems co-existence e.g. LTE, UTRAN and GSM then one set of constrained power control parameters' values may be applied.

According to yet some embodiments the constraint on the power control parameters' values may be applied by combining one or more of the previously described embodiments. For instance, different sets of constrained parameter values depending upon the type of service, activity, RB allocation such as e.g. whether at band edge or not, and so on. Like in previous embodiments, the combined scenario may be realized by specifying pre-defined rules in the standard e.g. lookup table containing various scenarios versus the corresponding set of power control parameter's values.

The previous embodiments describe various constraints on the power control parameters' values used for uplink power control. However, these embodiments are also applicable for the downlink power control. In the downlink power control scenario, the constraint on the parameter values will also be applicable to the radio network nodes 110, 120. For downlink power control, the radio network nodes 110, 120 do not signal any parameter to the mobile terminal 130. However, the radio network node 110, 120 may itself transmit power in the downlink in accordance with the constrained set of downlink power control parameter values', which can be pre-defined in the standard according to one or more of the embodiments described previously or it can be an implementation algorithm in the radio network node 110, 120.

Typically constant power spectral density is easy to maintain in the downlink by the virtue of frequency domain scheduling. However, in the uplink, power control may always be used. Therefore, in comparison with the downlink, the constraint on power control parameter values in the uplink may be more critical and important.

Further yet, power control parameter values may according to some different embodiments be determined according to different methods or alternative ways.

Thus suitable maximum values of the power control parameters, which may ensure the interference to the victim system remains within acceptable limit. Once these optimal parameters are found then they are used in the actual device such as e.g. the radio network node 110, 120 for controlling the uplink power control.

According to some embodiments, it may be assumed that the power control parameter determining unit has sufficient statistical knowledge of propagation environments in the interfering radio network and between the interfering radio network and the victim radio network. It also has the models of the interfering radio network power control algorithm. For a given set of power control parameter values the determining unit can simulate the interference generated to the victim system.

The power control parameter determining unit, i.e. the simulator, may take as input the acceptable level of interference $I^J_{max}$ to the victim system J. The unit adjusts power control parameter values in the simulation model such that the simulated interference is equal to the acceptable interference level. The unit varies the values of a subset of the parameter by specified amounts and then searches for values of the remaining subset of parameters such that the interference level is met again. Eventually for the target or acceptable interference, the power control parameter values are selected and can be employed by the aggressor system for running the uplink power control.

According to some further embodiments, the power control parameter determining unit has measuring devices for measuring the interference from the interfering to the victim system. For a given set of power control parameter values the measuring device can measure the interference generated to the victim system. Like in alternative one, a subset of the power control parameters may be iteratively varied by specified amounts until the interference level at the victim system is reached within an acceptable range. The actual devices involved in tuning of power control parameters may be used e.g. during the periods of low traffic load in both interfering and victim radio network.

Eventually the obtained power control parameter values for the target or acceptable interference such as i.e. $I^J_{max}$ to the victim system "J" can be employed by the aggressor system for running the uplink power control.

This relationship may be expressed in terms of a look up table or a mapping function or any suitable interpolation function, which is eventually used for setting the values of the power control parameters corresponding to the acceptable interference $I^J_{max}$ at the victim system.

Such a look up table or a mapping function based on the actual measured statistics may be regularly updated and may thereby optionally become more reliable over a period of time. The power control parameters may eventually be tuned and used at the aggressor system.

According to yet some further embodiments, both actual statistics of the measured interference at the victim system and the power control parameter values may be plugged in the simulator for fine tuning the eventual power control parameters to be used by the network. This means both actual measured statistics and the statistical models may be used to determine the actual power control parameters, which will ensure that the interference, i.e. $I^J_{max}$ to the victim system "J" remain within the acceptable limit. Thus this embodiment may be regarded as a combination of the preceding alternatives.

The parameter set values found in this way may establish the vertices of a region of admissible parameter values. The border of the region may be found by connecting the vertices, e.g. such that the region is constrained by a set of linear inequalities in the parameter values.

The region determining unit may determine the parameter value region just once before the interfering or victim system is brought into regular operation or periodically in order to track potential changes in the propagation environment or after network planning or whenever triggered by the operator.

According to some aspects, the object is achieved by a method in a first radio network node 110, adapted to operate on a first type of radio technology of controlling the uplink transmission power of one or more mobile terminals 130. The uplink power is at least partly controlled and configured by the signalling of one or more parameters to the mobile terminal 130. The method comprises the steps of:

Maintaining the uplink transmission power such that interference received at a second radio network node 120, adapted to operate on a second type of radio technology remains below an interference threshold limit value.

Selecting values of the power control parameters under the constraints that the values for one set of parameters depends on the value chosen for the other set of parameters such that the combination of all parameter values is within an acceptable range, which is suitable for the first and second types of radio technologies.

The first type of radio technology may according to some embodiments be any of E-UTRAN FDD or E-UTRAN TDD.

The second type of radio technology may according to some embodiments be any of UTRAN FDD, UTRAN TDD or GSM.

Also, the object may be achieved by a method according to any of the embodiments above, wherein the constrained power control parameters comprise one or more cell specific parameters and parameters related to the target received power or interference level at the first radio network node 110 of interfering technology.

Further, the object may be achieved by a method according to any of the embodiments above wherein the constrained power control parameters' values are applied or specific to one or more of the following scenario: the mobile terminal 130 using resource blocks at the edge of transmission bandwidth, type of service, the mobile terminal 130 transmission and/or reception activity levels, data block size, the mobile terminal 130 position or path loss between the mobile terminal 130 and serving radio network node 110, co-existence scenario or any combination thereof.

Figure 2:
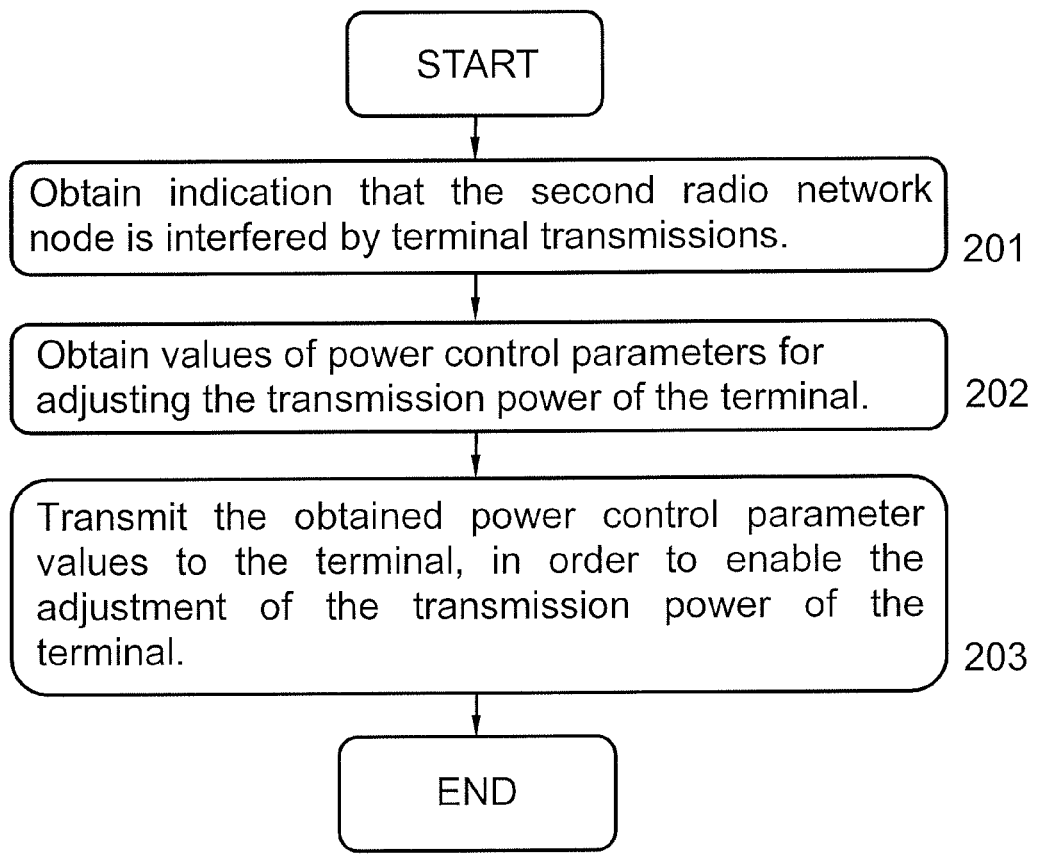
FIG. 2 is a schematic flow chart illustrating embodiments of a method in a first radio network node.

FIG. 2 is a flow chart illustrating a method in a first radio network node 110, according to some embodiments. The method aims at supporting transmission power adjustment of a mobile terminal 130 in order to reduce interference caused by the mobile terminal 130 on a second radio network node 120. The second radio network node 120 is situated at the same geographical location 100 as the first radio network node 110. The first radio network node 110 and the mobile terminal 130 are configured for operation on a first radio access technology while the second radio network node 120 is configured for operation on a second radio access technology.

The first type of radio access technology may according to some embodiments be any of E-UTRAN FDD or E-UTRAN TDD. The second type of radio access technology may according to some embodiments be any of UTRAN FDD, UTRAN TDD or GSM.

The first radio network node 110 and the second radio network node 120 may operate in adjacent carrier frequencies or adjacent radio frequency channels, according to some embodiments.

To appropriately support transmission power adjustment of the mobile terminal 130, the method in the first radio network node 110 may comprise a number of steps 201-203. It is however to be noted that some of the described method steps are optional and only comprised within some embodiments. Further, it is to be noted that the method steps 201-203 may be performed in any arbitrary chronological order and that some of them, e.g. step 201 and step 202, or even all steps may be performed simultaneously or in an altered, arbitrarily rearranged, decomposed or even completely reversed chronological order. The method may comprise the following steps:

Step 201

An indication that the second radio network node 120 is interfered by transmissions from the mobile terminal 130 is obtained.

This step may optionally be based on an estimation, concerning the radio traffic situation within the geographical location 100.

Further, this step may optionally comprise determining the category of environment, such as e.g. rural area, urban area, wherein the geographical location 100 is situated. Further, the radio traffic load at the geographical location 100 may be estimated, e.g. determined to be "low", "medium" or "high".

Optionally this step may comprise measurements, such that the indication that the second radio network node 120 is interfered by transmissions from the mobile terminal 130 may be based on a measurement which may be performed e.g. by the first radio network node 110 and/or the second radio network node 120 and signalled to the first radio network node 110.

Step 202

Values of power control parameters for adjusting the transmission power of the mobile terminal 130 are obtained.

According to some embodiments, such values of power control parameters may be based on previously assembled statistical data concerning different radio propagation conditions at the geographical location 100 such as e.g. rural area or urban area assumptions. Thus according to some embodiments, the values of power control parameters may be obtained from a look up table, where appropriate values of power control parameters previously have been assembled.

However, according to some optional embodiments, the step of obtaining values of power control parameters may be based on measurements, which may be performed e.g. by the first radio network node 110 and/or the second radio network node 120 and signalled to the first radio network node 110.

Further, according to some optional embodiments, the values of power control parameters may depend upon the size of the data block transmitted in the uplink.

In addition, according to some embodiments, the values of power control parameters may depend upon the characteristics and/or activity level of the service used in the uplink.

Step 203

The obtained power control parameter values are transmitted to the mobile terminal 130, in order to enable the adjustment of the transmission power of the mobile terminal 130.

According to some optional embodiments, also the transmission power of the first radio network node 110 may be adjusted in order to avoid or at least reduce interference with the second radio network node 120.

Figure 3:
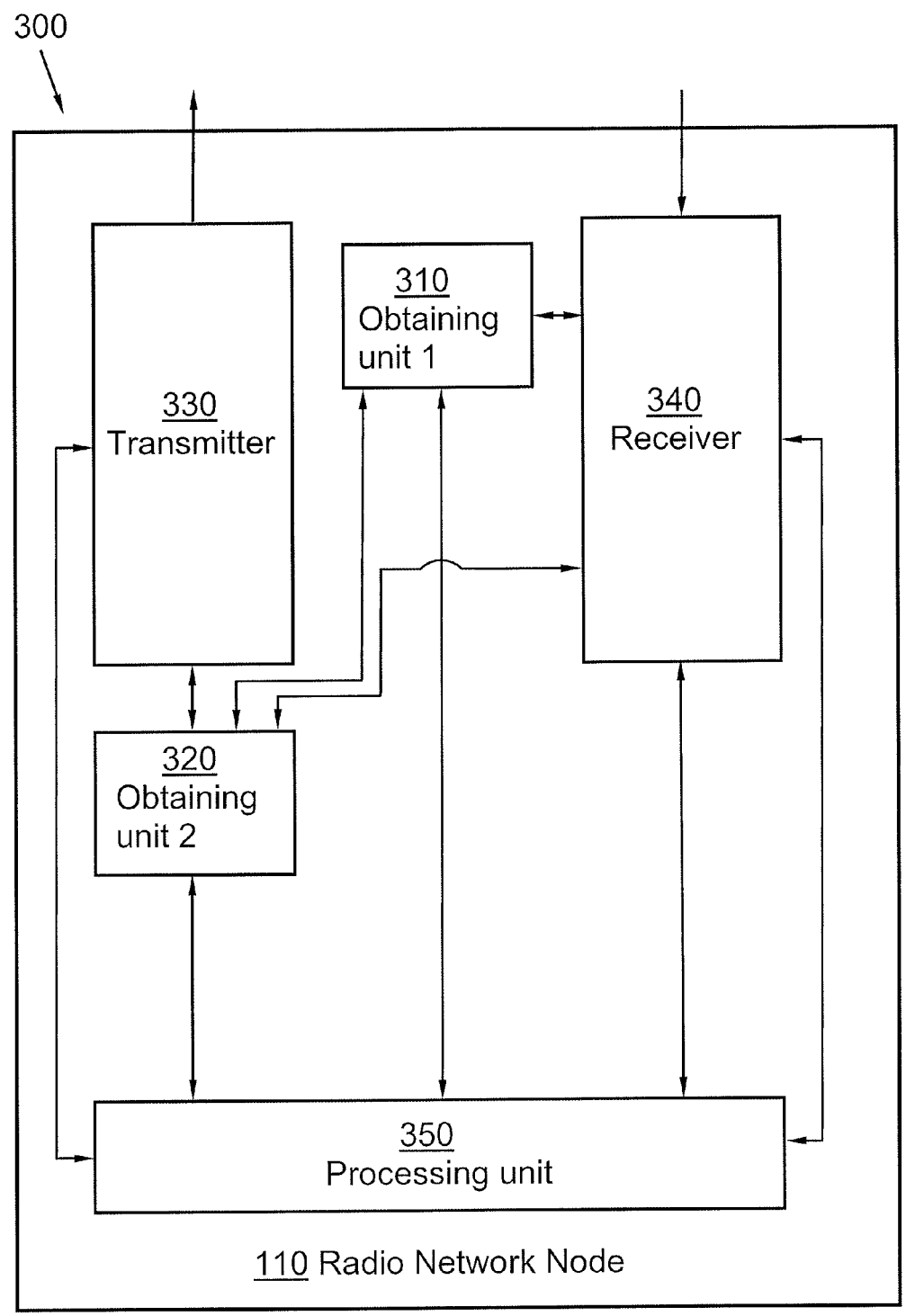
FIG. 3 is a block diagram illustrating embodiments of an arrangement in a first radio network node.

FIG. 3 is a block diagram illustrating embodiments of an arrangement 300 situated in a first radio network node 110. The first radio network node 110 is adapted to operate on a first radio access technology. The arrangement 300 is configured to perform the method steps 201-203 for supporting transmission power adjustment of a mobile terminal 130 in order to reduce interference caused by the mobile terminal 130 on a second radio network node 120. The second radio network node 120 is adapted to operate on a second radio access technology.

For the sake of clarity, any internal electronics of the arrangement 300, not completely necessary for understanding the present solution has been omitted from FIG. 3.

The arrangement 300 comprises a first obtaining unit 310. The first obtaining unit 310 is adapted to obtain an indication that the second radio network node 120 is interfered by transmissions from the mobile terminal 130. Further, the arrangement 300 comprises a second obtaining unit 320. The second obtaining unit 320 is adapted to obtain values of power control parameters for adjusting the transmission power of the mobile terminal 130.

In addition, the arrangement 300 comprises a transmitter 330. The transmitter 330 is adapted to transmit the obtained power control parameter values to the mobile terminal 130, in order to enable the adjustment of the transmission power of the mobile terminal 130.

The arrangement 300 may according to some embodiments comprise a processing unit 350. The processing unit 350 may be represented by e.g. a Central Processing Unit (CPU), a processor, a microprocessor, or other processing logic that may interpret and execute instructions. The processing unit 350 may perform all data processing functions for inputting, outputting, and processing of data including data buffering and device control functions, such as call processing control, user interface control, or the like.

Also, the arrangement 300 optionally may comprise a receiver 340, adapted to receive radio signal.

It is to be noted that the described units 310-350 comprised within the arrangement 300 may be regarded as separate logical entities, but not with necessity as separate physical entities. Any, some or all of the units 310-350 may be comprised or co-arranged within the same physical unit. However, in order to facilitate the understanding of the functionality of the arrangement 300, the comprised units 310-350 are illustrated as separate physical units in FIG. 3.

Thus the transmitter 330 and e.g. the receiver 340 may, according to some embodiments, be comprised within one physical unit, a transceiver, which may comprise a transmitter circuit and a receiver circuit, which respectively transmits outgoing radio frequency signals to the mobile terminals 130 and receives incoming radio frequency signals from the mobile terminals 130 via an optional antenna. The antenna may be an embedded antenna, a retractable antenna or any other arbitrary antenna without departing from the scope of the present arrangements.

The method steps 201-203 in the first radio network node 110 may be implemented through one or more processing units 350 in the first radio network node 110, together with computer program code for performing the functions of the present method steps 201-203. Thus a computer program product, comprising instructions for performing the method steps 201-203 in the first radio network node 110 may perform the described method for supporting transmission power adjustment of a mobile terminal 130, when being loaded into the processing unit 350 in the first radio network node 110.

The computer program product mentioned above may be provided for instance in the form of a data carrier carrying computer program code for performing the method steps 201-203 according to the present solution when being loaded into the processing unit 350. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the first radio network node 110 remotely.

Thus the computer program product comprises instructions for obtaining an indication that the second radio network node 120 is interfered by transmissions from the mobile terminal 130. Also, the computer program product comprises instructions for obtaining values of power control parameters for adjusting the transmission power of the mobile terminal 130. In addition, the computer program product comprises instructions for transmitting the obtained power control parameter values to the mobile terminal 130, in order to enable the adjustment of the transmission power of the mobile terminal 130, when the computer program product is run on a processing unit 350 comprised within the first radio network node 110, when being loaded into the processing unit 350 in the first radio network node 110.

Figure 4:
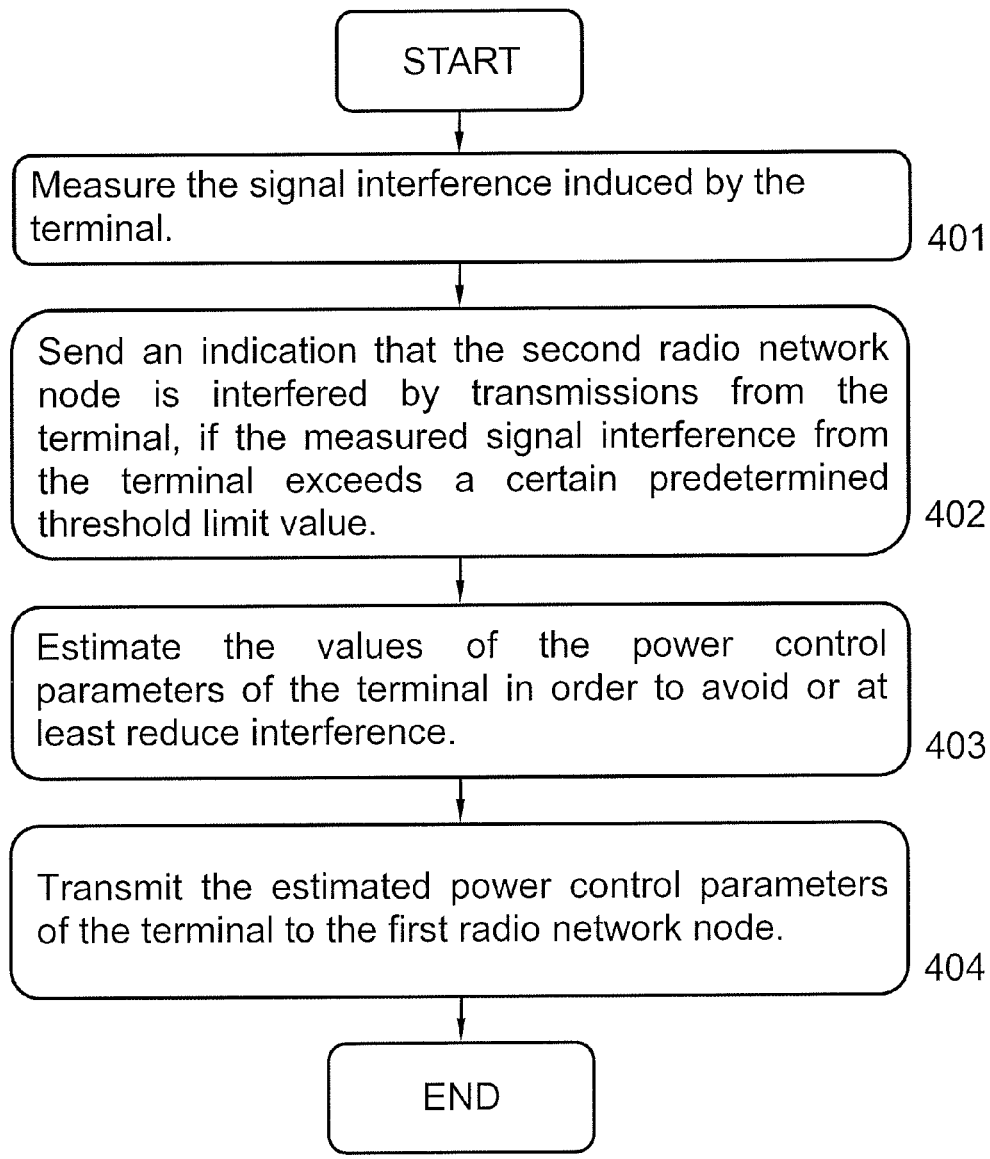
FIG. 4 is a schematic flow chart illustrating embodiments of a method in a second radio network node.

FIG. 4 is a flow chart illustrating a method in a second radio network node 120, according to some embodiments. The method aims at assisting a first radio network node 110 in supporting transmission power adjustment of a mobile terminal 130 in order to reduce interference, caused by the mobile terminal 130. The first radio network node 110 and the second radio network node 120 are situated at the same geographical location 100. The first radio network node 110 and the mobile terminal 130 are configured for operation on a first radio access technology while the second radio network node 120 is configured for operation on a second radio access technology.

The first type of radio access technology may according to some embodiments be any of E-UTRAN FDD or E-UTRAN TDD. The second type of radio access technology may according to some embodiments be any of UTRAN FDD, UTRAN TDD or GSM.

To appropriately assisting the first radio network node 110 in supporting transmission power adjustment of the mobile terminal 130, the method in the second radio network node 120 may comprise a number of steps 401-404. It is however to be noted that some of the described method steps 401-404 are optional and only comprised within some embodiments. Further, it is to be noted that the method steps 401-404 may be performed in any arbitrary chronological order and that some of them, e.g. step 401 and step 402, or even all steps may be performed simultaneously or in an altered, arbitrarily rearranged, decomposed or even completely reversed chronological order. The method may comprise the following steps:

Step 401

The signal interference, induced by the mobile terminal 130, is measured.

Step 402

An indication that the second radio network node 120 is interfered by transmissions from the mobile terminal 130 is sent to the first radio network node 110, if the measured signal interference from the mobile terminal 130 exceeds a certain predetermined threshold limit value.

Step 403

The values of the power control parameters of the mobile terminal 130 may optionally be estimated in order to avoid or at least reduce interference.

Step 404

The estimated power control parameters of the mobile terminal 130 may according to some embodiments be transmitted to the first radio network node 110.

Figure 5:
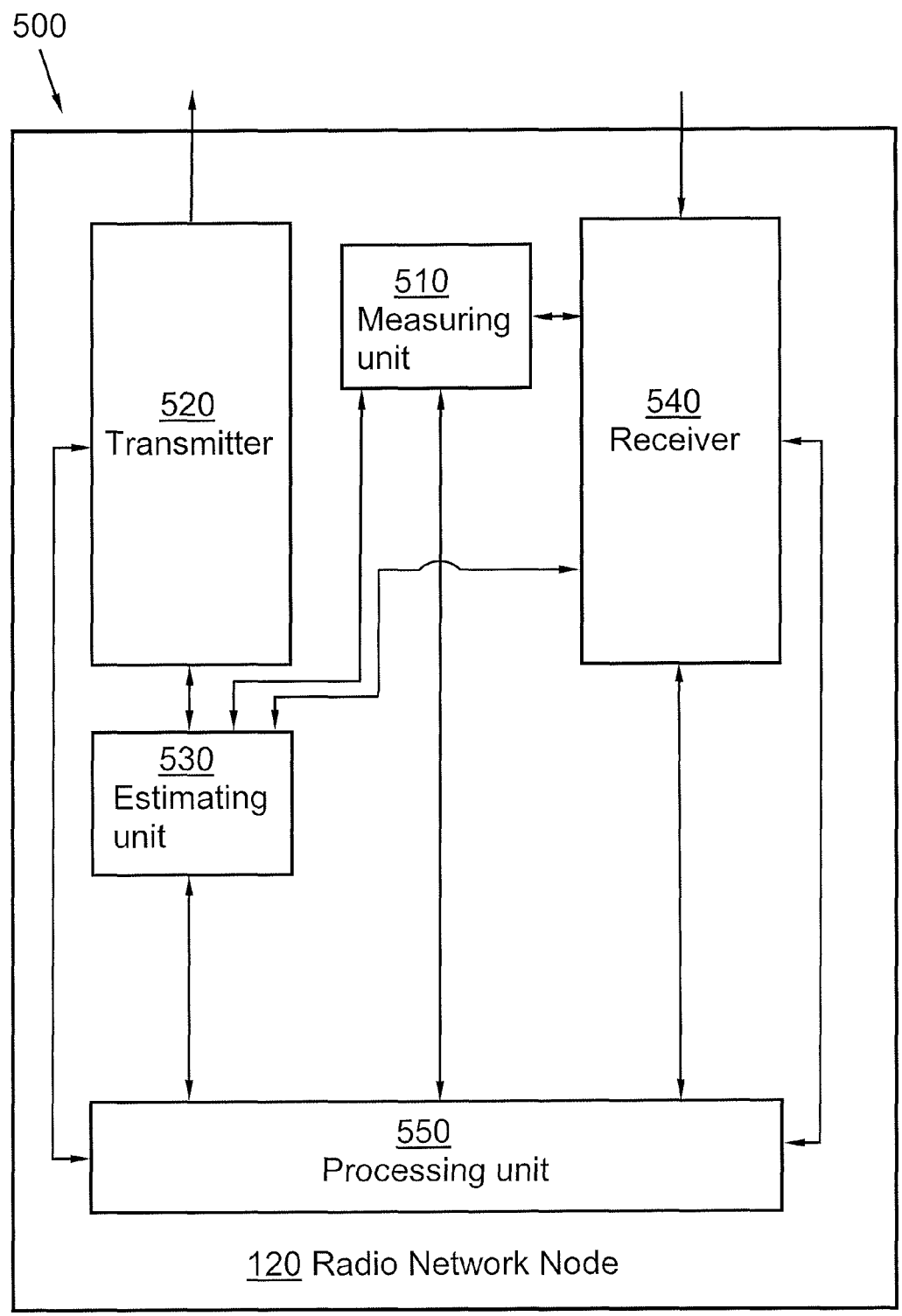
FIG. 5 is a block diagram illustrating embodiments of an arrangement in a second radio network node.

FIG. 5 is a block diagram illustrating embodiments of an arrangement 500 situated in a second radio network node 120. The arrangement 500 is configured to perform the method steps 401-404 for assisting a first radio network node 110 in supporting transmission power adjustment of a mobile terminal 130. The first radio network node 110 and the mobile terminal 130 are adapted to operate on the first radio access technology. The second radio network node 120 is adapted to operate on a second radio access technology.

For the sake of clarity, any internal electronics of the arrangement 500, not completely necessary for understanding the present solution has been omitted from FIG. 5.

The arrangement 500 comprises a measuring unit 510. The measuring unit 510 is adapted to measure the signal interference induced by the mobile terminal 130 on the second radio network node 120. Further, the arrangement 300 comprises a transmitter 520. The transmitter 520 is adapted to transmit an indication that the second radio network node 120 is interfered by transmissions from the mobile terminal 130, if the measured signal interference from the mobile terminal 130 exceeds a certain predetermined threshold limit value.

Further, according to some optional embodiments, the arrangement 500 may comprise an estimating unit 530. The optional estimating unit 530 may be adapted to estimate the appropriate values of the power control parameters of the mobile terminal 130, in order to avoid or at least reduce interference with the second radio network node 120.

Also, the arrangement 500 optionally may comprise a receiver 540, adapted to receive radio signals.

The arrangement 500 may according to some embodiments comprise a processing unit 550. The processing unit 550 may be represented by e.g. a Central Processing Unit (CPU), a processor, a microprocessor, or other processing logic that may interpret and execute instructions. The processing unit 550 may perform all data processing functions for inputting, outputting, and processing of data including data buffering and device control functions, such as call processing control, user interface control, or the like.

It is to be noted that the described units 510-550 comprised within the arrangement 500 may be regarded as separate logical entities, but not with necessity as separate physical entities. Any, some or all of the units 510-550 may be comprised or co-arranged within the same physical unit. However, in order to facilitate the understanding of the functionality of the arrangement 500, the comprised units 510-550 are illustrated as separate physical units in FIG. 5.

Thus the transmitter 520 and e.g. the receiver 540 may, according to some embodiments, be comprised within one physical unit, a transceiver, which may comprise a transmitter circuit and a receiver circuit, which respectively transmits outgoing radio frequency signals to e.g. the mobile terminal 130 and receives incoming radio frequency signals from e.g. the mobile terminal 130 via an optional antenna.

The method steps 401-404 in the second radio network node 120 may be implemented through one or more processing units 550 in the second radio network node 120, together with computer program code for performing the functions of the present steps 401-404. Thus a computer program product, comprising instructions for performing the method steps 401-404 in the second radio network node 120 may perform a method for assisting a first radio network node 110 in supporting transmission power adjustment of a mobile terminal 130, when the computer program product is run on a processing unit 550 comprised within the second radio network node 120.

The computer program product mentioned above may be provided for instance in the form of a data carrier carrying computer program code for performing the method steps 401-404 according to the present solution when being loaded into the processing unit 550. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the second radio network node 120 remotely, e.g. over an Internet or an intranet connection.

The computer program product comprises instructions for performing measurement of the signal interference induced by the mobile terminal 130 on the second radio network node 120. Also, the computer program product comprises instructions for sending an indication that the second radio network node 120 is interfered by transmissions from the mobile terminal 130 to the first radio network node 110, if the measured signal interference from the mobile terminal 130 exceeds a certain predetermined threshold limit value, when the computer program product is run on a processing unit 550 comprised within the second radio network node 120.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a first radio network node, for supporting transmission power adjustment of a mobile terminal to reduce interference caused by the mobile terminal on a second radio network node in a same geographical location as the first radio network node, the first radio network node and the mobile terminal being configured for operation on a first radio access technology and the second radio network node being configured for operation on a second radio access technology, different from the first radio access technology, the method comprising:
   determining that transmissions from the mobile terminal are interfering with the second radio network node by estimating a radio traffic situation within the same geographical location;
   extracting values of power control parameters for adjusting a transmission power of the mobile terminal from a predefined look-up table, wherein appropriate values of power control parameters have been previously assembled; and
   transmitting the extracted values of power control parameter to the mobile terminal for adjusting the transmission power of the mobile terminal.

2. The method of claim 1, wherein the values of power control parameters are based on previously assembled statistical data concerning different radio propagation conditions at the geographical location.

3. The method of claim 1, wherein the predefined look-up table has multiple dimensions, one for each power control parameter such that a value of one power control parameter depends on values chosen for all other parameters.

4. The method of claim 1, wherein the values of power control parameters are based on performed measurements concerning radio propagation conditions.

5. The method of claim 1, wherein the values of power control parameters are applicable for channels used at an edge of a channel bandwidth.

6. The method of claim 1, wherein the values of power control parameters depend upon a channel used for uplink transmission.

7. The method of claim 1, wherein the values of power control parameters depend upon a size of a data block transmitted in an uplink transmission.

8. The method of claim 1, wherein the values of power control parameters depend upon a bandwidth of a channel used for an uplink transmission.

9. The method of claim 1, wherein the values of power control parameters depend upon characteristics and/or activity level of a service used in an uplink transmission.

10. The method of claim 1, wherein the transmission power of the first radio network node is adjusted to at least reduce interference with the second radio network node.

11. The method of claim 1, wherein the first radio network node and the second radio network node are configured to operate in one of adjacent carrier frequencies and adjacent radio frequency channels.

12. An arrangement in a first radio network node for supporting transmission power adjustment of a mobile terminal to reduce interference caused by the mobile terminal on a second radio network node in a same geographical location as the first radio network node, the first radio network node and the mobile terminal being configured for operation on a first radio access technology and the second radio network node being configured for operation on a second radio access technology, different from the first radio access technology, the arrangement comprising:
- a first obtaining unit configured to determine that transmission from the mobile terminal are interfering with the second radio network node by estimating a radio traffic situation within the same geographical location;
- a second obtaining unit configured to extract values of power control parameters for adjusting a transmission power of the mobile terminal from a predefined look-up table; and
- a transmitter configured to transmit the extracted values of power control parameters to the mobile terminal to enable adjustment of the transmission power of the mobile terminal.

13. The arrangement of claim 12, wherein the values of power control parameters are based on previously assembled statistical data concerning different radio propagation conditions at the geographical location.

14. The arrangement of claim 12, wherein the predefined look-up table has multiple dimensions, one for each power control parameter such that a value of one power control parameter depends on values chosen for all other parameters.

15. The arrangement of claim 12, wherein the values of power control parameters are based on performed measurements concerning radio propagation conditions.

16. The arrangement of claim 12, wherein the values of power control parameters are applicable for channels used at an edge of a channel bandwidth.

17. The arrangement of claim 12, wherein the values of power control parameters depend upon a channel used for uplink transmission.

18. The arrangement of claim 12, wherein the values of power control parameters depend upon a size of a data block transmitted in an uplink transmission.

19. The arrangement of claim 12, wherein the values of power control parameters depend upon a bandwidth of a channel used for an uplink transmission.

20. The arrangement of claim 12, wherein the values of power control parameters depend upon characteristics and/or activity level of a service used in an uplink transmission.

21. The arrangement of claim 12, wherein the transmission power of the first radio network node is adjusted to at least reduce interference with the second radio network node.

22. The arrangement of claim 12, wherein the first radio network node and the second radio network node are configured to operate in one of adjacent carrier frequencies and adjacent radio frequency channels.

* * * * *

UNITED STATES PATENT AND TRADEMARK OFFICE
CERTIFICATE OF CORRECTION

PATENT NO. : 8,880,112 B2  Page 1 of 1
APPLICATION NO. : 13/148433
DATED : November 4, 2014
INVENTOR(S) : Huschke et al.

It is certified that error appears in the above-identified patent and that said Letters Patent is hereby corrected as shown below:

In the specification

Column 1, below Line 15, insert Heading -- FIELD --.

Column 2, Line 42, delete "dB" and insert -- dB. --, therefor.

Column 7, Line 44, delete "HRPD" and insert -- High Rate Packet Data (HRPD), --, therefor.

Column 9, Line 26, delete "power," and insert -- power --, therefor.

Signed and Sealed this
Twenty-third Day of February, 2016

Michelle K. Lee
*Director of the United States Patent and Trademark Office*